US007584070B2

(12) United States Patent
Kotani et al.

(10) Patent No.: US 7,584,070 B2
(45) Date of Patent: Sep. 1, 2009

(54) TESTING/ADJUSTING METHOD AND TEST CONTROL APPARATUS FOR ROTATING DISK STORAGE DEVICES

(75) Inventors: Yasuhiro Kotani, Kanagawa-ken (JP); Hiroaki Suzuki, Kanagawa-ken (JP); Makoto Takase, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 790 days.

(21) Appl. No.: 11/177,028

(22) Filed: Jul. 7, 2005

(65) Prior Publication Data

US 2006/0009939 A1 Jan. 12, 2006

(30) Foreign Application Priority Data

Jul. 7, 2004 (JP) ............................. 2004-200347

(51) Int. Cl.
*G01L 25/00* (2006.01)
(52) U.S. Cl. .................... 702/115; 356/507; 365/222; 702/119
(58) Field of Classification Search ................ 702/115, 702/118, 119, 121, 123; 360/51, 69, 73.02, 360/78.04; 29/603.01, 603.03, 603.09; 712/244; 365/222; 356/507
See application file for complete search history.

(56) References Cited

U.S. PATENT DOCUMENTS 5,502,565 A * 3/1996 Fukuzawa et al. .......... 356/507

2005/0207253 A1 * 9/2005 Takase et al. ............... 365/222

FOREIGN PATENT DOCUMENTS

| JP | 06-266654 | 9/1994 |
|---|---|---|
| JP | 08-095901 | 4/1996 |
| JP | 10-240680 | 9/1998 |
| JP | 2001-109581 | 4/2001 |
| JP | 2002-116998 | 4/2002 |
| JP | 2004-178744 | 6/2004 |
| JP | 2005-267239 | 9/2005 |

* cited by examiner

*Primary Examiner*—John H Le
(74) *Attorney, Agent, or Firm*—Townsend and Townsend and Crew LLP; Patrick Duncan (57) ABSTRACT

Embodiments of the invention provide a method of testing/adjusting magnetic disk devices, in which the method allows the tests/adjustments to be conducted by solving problems due to the data sizes and characteristics of test/adjustment programs. After assembly of a magnetic disk device, setup of various parameters, magnetic disk defect registration, and other test/adjustment steps are executed. Execution of the test/adjustment programs does not require a special test apparatus since they are executed in the magnetic disk device to be tested. In addition, the test/adjustment programs are formed up of multiple phases, and each phase is sequentially executed. Adoption of this program structure keeps the tests/adjustments clear from restrictions due to the data sizes and characteristics of the test/adjustment programs.

12 Claims, 5 Drawing Sheets

TESTING/ADJUSTING METHOD AND TEST CONTROL APPARATUS FOR ROTATING DISK STORAGE DEVICES

CROSS-REFERENCES TO RELATED APPLICATIONS

This application claims priority from Japanese Patent Application No. JP 2004-200347, filed Jul. 7, 2004, the entire disclosure of which is incorporated herein by reference.

BACKGROUND OF THE INVENTION

The present invention relates to a testing/adjusting method and test control apparatus for magnetic disk devices, magneto-optic disk devices, and other rotating-disk-type storage devices.

Magnetic disk devices, an example of rotating-disk-type storage devices, are information storage and reproduction devices that use a head(s) to write/read data onto/from the respective magnetic disks. It is necessary to adjust parameters on the heads and amplifiers of magnetic disk devices and to register information on defective sectors of their magnetic disks. After being assembled, therefore, these disk devices undergo various tests and adjustments and are set to a state in which each may develop its function as a product, prior to shipping.

Up to now, during these tests and adjustments, each of the magnetic disk devices has been sequentially mounted on a special test apparatus having about 60 to 100 cells, and then the test apparatus has executed test/adjustment programs to control the operation of the magnetic disk device. Under these testing and adjusting methods, however, the number of magnetic disk devices which may be tested and adjusted at a time is limited by the number of cells, and if the scale of the test apparatus is expanded for an increased number of cells, the amount of investment required increases correspondingly. The conventional testing and adjusting methods have therefore been required to be improved.

BRIEF SUMMARY OF THE INVENTION

As mentioned above, considerable investment is unavoidable to test and adjust a large quantity of magnetic disk devices using the conventional test apparatus that sequentially controls the operation of the magnetic disk devices. For this reason, a new method in which a magnetic disk device is to transfer test/adjustment programs to the next magnetic disk device to be tested/adjusted and then the magnetic disk device that has received these programs is to perform tests/adjustments by autonomously executing the programs is proposed in Japanese Patent Application No. 2002-345923, the patent acquisition right of which was assigned to the applicant of the present invention. Hereinafter, the foregoing new method is referred to as a self-executory test/adjustment method. Additionally, a technology for operating magnetic disk devices in host mode in order to transfer programs relating to tests/adjustments is disclosed in Japanese Patent Application No. 2004-78569 filed by the applicant of the present invention.

However, the foregoing method in which each magnetic disk device that requires testing/adjusting is to perform tests/adjustments in a self-executory manner may not be easily feasible, depending on the particular data sizes or characteristics of the test/adjustment programs used. For example, there is the inconvenience that for a magnetic disk device whose assembly has only been completed, since magnetic disk head parameter setup, magnetic disk defect registration, and other processes are not yet completed, the magnetic disk device cannot record test/adjustment programs on its own magnetic disk and can thus receive only test/adjustment programs of a small data size from an external device when the tests/adjustments are started.

Programs concerned with tests/adjustments are not a necessity to the magnetic disk device completed as a product, and providing beforehand a semiconductor memory for storage of the programs, such as a ROM, is not realistic in terms of costs. In addition, the elements constituting the test/adjustment programs include the elements that should be created/transferred in a split state to allow for the convenience in terms of testing/adjusting efficiency. Furthermore, the elements constituting the test/adjustment programs also include the elements having the nature which, to guarantee the quality of the magnetic disk device reliably, requires tests/adjustments to be performed by executing those test/adjustment programs inside the program transfer source magnetic disk device and then accessing the magnetic disk device to be tested/adjusted, rather than by executing all test/adjustment programs inside the magnetic disk device to which the programs are to be transferred. The data sizes and characteristics of these test/adjustment programs bring about new improvement items particularly when a large quantity of magnetic disk devices are to be concurrently tested/adjusted in a self-executory manner.

In addition, when a large quantity of magnetic disk devices are to be tested/adjusted in a self-executory manner with one of these magnetic disk devices being used as a host device, if the magnetic disk devices employ an ATA interface, efficient tests/adjustments may not be executable. For magnetic disk devices each equipped with an ATA interface, only two units (namely, a master and a slave) can be connected to one controller. Therefore, if two magnetic disk devices are to be tested/adjusted using a tested/adjusted magnetic disk device, one magnetic disk device is kept waiting for shipping, until the tests/adjustments have been completed, and as a result, production volumes decrease.

A feature of the present invention, therefore, is to provide a method of testing/adjusting rotating-disk-type storage devices, wherein the method allows each of the storage devices to conduct tests/adjustments in a self-executory manner without being restricted by the data sizes or characteristics of the test/adjustment programs used. Another feature of the present invention is to provide a method for conducting tests/adjustments in a self-executory manner for the magnetic disk devices that employ an ATA interface, and a test control apparatus using the method.

In terms of principles, the present invention is characterized in that during the testing/adjusting of a rotating-disk-type storage device after assembly thereof, the invention solves problems due to the data sizes and characteristics of test/adjustment programs and thus ensures that the rotating-disk-type storage device tested/adjusted may execute the test/adjustment programs on its own. The test/adjustment programs are formed of plural split phases. The rotating-disk-type storage device executes the test/adjustment programs of each phase, transferred in numerical order of the phases, and when a program of one phase is executed to completion, the storage device receives a program of the next phase. The storage device sequentially executes each program in this way.

The present invention provides, as a first aspect thereof, a method for testing/adjusting a rotating-disk-type storage device connected to a host device via a data transmission path, the method comprising: the host device transferring the test/adjustment program of a first phase, stored within the host device, to the rotating-disk-type storage device; the rotating-disk-type storage device executing the test/adjustment program of the first phase; the host device detecting that the rotating-disk-type storage device is requesting the host device to transfer the test/adjustment program of a second phase, stored within the host device; and in response to the request in the above detection step, the host device transferring the test/adjustment program of the second phase to the rotating-disk-type storage device.

The rotating-disk-type storage device executes test/adjustment programs on its own and thus does not require use of a special test apparatus. Additionally, the rotating-disk-type storage device executes the test/adjustment programs constructed of plural phases. The plural-phase construction of the test/adjustment programs is convenient in that the storage device may conduct self-executory tests/adjustments without being restricted by the total program scale, and in that command tests inclusive of up to an interface may be performed for a further improvement in quality assurance. Furthermore, transfer of the test/adjustment programs to a tested/adjusted magnetic disk device allows the magnetic disk device to serve as a host device and conduct tests/adjustments on another magnetic disk device.

The present invention provides, as a second aspect thereof, a method for testing/adjusting a first magnetic disk device and a second magnetic disk device, both connected to a host device via a data transmission path, the method comprising: the host device transferring the test/adjustment program of a first phase, stored within the host device, to the first magnetic disk device and the second magnetic disk device; the first magnetic disk device and the second magnetic disk device executing the test/adjustment program of the first phase; the host device detecting that the first magnetic disk device or the second magnetic disk device is requesting the host device to transfer the test/adjustment program of a second phase, stored within the host device; and in response to the request in the above detection step, the host device transferring the test/adjustment program of the second phase to the magnetic disk device requesting the test/adjustment program.

The procedure for transferring test/adjustment programs is managed by the host device, and all test/adjustment programs, except for command tests, are executed by each magnetic disk device. Except when conducting command tests, therefore, the host device needs only to monitor the progress of test/adjustment program execution inside each magnetic disk device and sequentially transfer test/adjustment programs of each phase. Since the host device may conduct self-executory tests/adjustments on multiple magnetic disk devices concurrently, this method is suitable for testing/adjusting a large quantity of magnetic disk devices. In addition, since the working load on the host device is light in comparison with that of a special test apparatus, this method is suitable for adopting a magnetic disk device as the host device.

The present invention provides, as a third aspect thereof, a test control apparatus comprising: a first ATA interface connector to which is connectible a first magnetic disk device that stores test/adjustment programs; a plurality of second ATA interface connectors to which are connectible a plurality of second magnetic disk devices to be tested/adjusted; a plurality of bus switches each connected to each of the plural second ATA interface connectors at one end, and connected to the first ATA interface connector at the other end; and a bus controller connected to the first ATA interface connector and each of the plural bus switches, the bus controller conducting control so as to close any of the plural bus switches by executing a command transferred from the first magnetic disk device.

The test control apparatus allows the magnetic disk device operating as a host device, to transfer and concurrently execute the test/adjustment programs with respect to the plural magnetic disk devices each having an ATA interface. As a result, even when ATA magnetic disk devices are each to perform tests/adjustments in a self-executory manner by transferring test/adjustment programs between the ATA magnetic disk devices, it becomes possible to perform these tests/adjustments on a large quantity of magnetic disk devices.

The present invention has made it possible to provide a method of testing/adjusting rotating-disk-type storage devices, wherein the method allows each of the storage devices to conduct tests/adjustments in a self-executory manner without being restricted by the data sizes or characteristics of the test/adjustment programs used. The present invention has also made it possible to provide a test/adjustment method and test control apparatus for conducting tests/adjustments in a self-executory manner for the magnetic disk devices that employ an ATA interface.

DETAILED DESCRIPTION OF THE INVENTION

Meaning of the Test/Adjustments

Embodiments of the present invention are described below taking a magnetic disk device as an example of a rotating-disk-type storage device. The description is given with the same reference number assigned to the same element throughout the SPECIFICATION and the accompanying drawings. The tests/adjustments in the present invention refer to a process performed in the final stage of manufacturing to give a function required of a completed product, to a magnetic disk device whose assembly has been completed, and to provide quality assurance to a user. An example of the test/adjustment process may be to write servo information with respect to a magnetic disk. In this example, servo information is written by the magnetic disk device adopting a self-servo write scheme. The self-servo write scheme is a scheme in which the magnetic disk device writes servo information from an internal head onto the magnetic disk of the magnetic disk device itself without using a special writing device such as a servo track writer.

Another example of the test/adjustment process may be a combination of magnetic disk inspection and defective sector registration. In general, a completed magnetic disk has defects in its magnetic layer, and the defects, even when small, might spread if they are left intact. To guarantee the quality of the magnetic disk device, the need may arise to adopt inspecting all sectors beforehand, registering the logical addresses of any defective sectors in a primary defect map (PDM), and prohibiting the use of the defective sectors.

Yet another example of the test/adjustment process may be to register position information relating to tracks. When a reproducing head is to be employed that uses a magnetoresistive (MR) element or a giant magnetoresistive (GMR) element, an independent recording head of the induction type is provided on a slider at fixed spacing from the reproducing head. There is a dimensional tolerance for the spacing between the recording head and the reproducing head. In addition, when a rotating actuator is used, since the slider rotates around a rotational axis of the actuator, the relationship in position between associated tracks of the recording head and those of the reproducing head changes (so-called "skew" occurs) according to particular positions of the heads in a radial direction of the magnetic disk.

More specifically, greater skew occurs at positions closer to the outermost track of the magnetic disk, and the spacing between associated tracks of the recording head and those of the reproducing head correspondingly spreads. Therefore, the magnetic disk device needs to be adapted so that after writing servo information, the disk device may acquire the characteristic track position information of the corresponding head and correctly recognize the relationship between the position of the reproducing head and that of the recording head at all positions on the magnetic disk.

Furthermore, since there also are tolerances for the width and sensitivity of the reproducing head, tests/adjustments become necessary partly because accurate position information on tracks needs to be made detectible from servo information by adjusting, according to particular manufacturing characteristics of the reproducing head, a position information signal (PES) gain of an amplifier for amplifying the PES reproduced by reading a servo burst pattern from the servo information.

These tests/adjustments require the operation of the magnetic disk device, such as actually moving the head to a required position on the magnetic disk or writing the logical addresses of sectors into an EEPROM (or the like) of the magnetic disk device. When a special test apparatus conducts tests/adjustments, the test apparatus fully controls such operation by sending commands to the magnetic disk device while confirming the response signals received therefrom.

Such a special test apparatus that directly controls the operation of the magnetic disk device to be tested/adjusted is not used during the tests/adjustments according to the present invention. Test/adjustment programs are transferred from an external host device to the magnetic disk device, which then autonomously executes the test/adjustment programs to conduct the tests/adjustments in a self-executory manner. The test/adjustment programs include those which send a command from the external host device to the intended magnetic disk device and confirm the response signal received therefrom. However, unlike a special test apparatus, the host device does not directly control the operation of the heads of the magnetic disk device.

Basic Test/Adjustment Method

Figure 1:
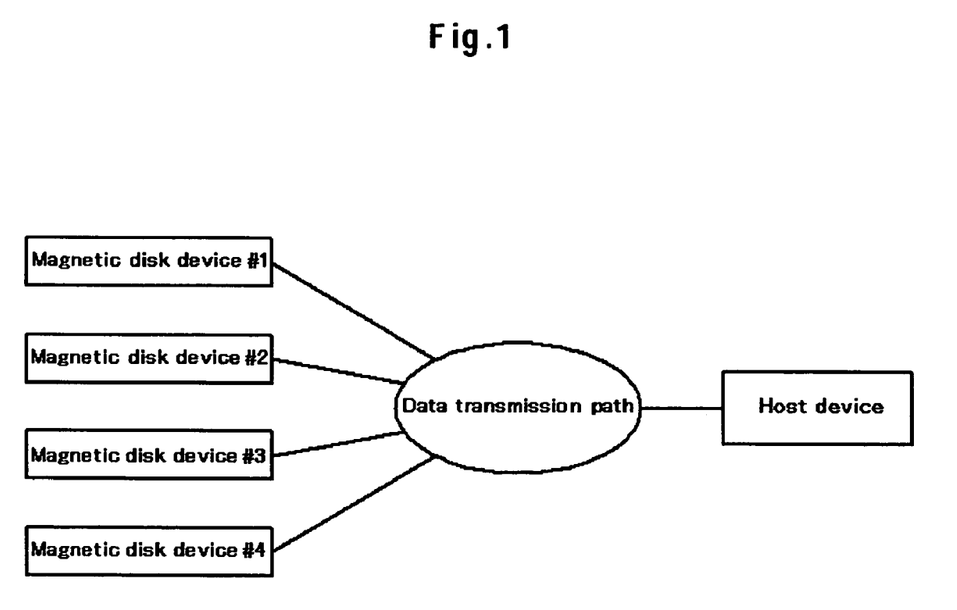
FIG. 1 is a diagram explaining a basic execution environment for testing/adjusting magnetic disk devices according to an embodiment of the present invention.

A basic execution environment for self-executory testing/adjusting of magnetic disk devices is shown in FIG. 1 as an embodiment of the present invention. In FIG. 1, magnetic disk devices #1 to #4 that are to be tested/adjusted, and a host device are connected via a data transmission path in a mutually data-transferable state. Although magnetic disk devices #1 to #4 have had their hardware assembly completed, they are in the state where they do not yet have a product function, since their tests/adjustments are not finished. However, firmware for conducting basic operation is already stored in a ROM, and a communications system for communicating with an external device, an MPU, a RAM, and other constituting elements not requiring special tests/adjustments are in an operative state.

The host device is a computer capable of performing data communications with magnetic disk devices #1 to #4 through the data transmission path, and has elements such as a processor, a RAM, a ROM, an auxiliary storage device, and an interface circuit for magnetic disk devices #1 to #4. The test/adjustment programs that magnetic disk devices #1 to #4 are to execute are stored within the auxiliary storage device of the host device. The test/adjustment programs are transferred from the host device through the data transmission path to any of the four magnetic disk devices.

The test/adjustment programs are formed of plural split phases, and the order in which the programs are transferred to any of the four magnetic disk devices is predetermined. The present embodiment assumes that the test/adjustment programs are formed of five phases from a first phase to a fifth phase. A case in which, during initiation of tests/adjustments, any of the four magnetic disk devices executes test/adjustment programs of the first to fourth phases in order of the phase number and the host device executes a test/adjustment program of the fifth phase, is described below by way of example.

The description here assumes that the test/adjustment program of the first phase relates to writing servo information with respect to a magnetic disk, that the test/adjustment program of the second phase relates to detecting and registering defective sectors, that the test/adjustment program of the third phase relates to collecting and recording track information, and that the test/adjustment program of the fourth phase relates to adjusting a PES gain.

The test/adjustment programs from the first phase to the fourth phase are transferred from the host device to each magnetic disk device in order of the phase number. The test/adjustment program of the fifth phase is intended for the command test assuming the actual operation performed at the user side. In this command test, the host device, after executing the program, sends a read/write command to each magnetic disk device and confirms associated operation, or sends a resetting command or a diagnosing command and confirms the results. The test/adjustment program of the fifth phase is not transferred to any of the four magnetic disk devices.

A test control program for transferring the test/adjustment programs of the first to fourth phases to each magnetic disk device in the required order, then making the magnetic disk device execute each program in order, and making the host device execute test/adjustment program of the fifth phase, is stored within the auxiliary storage device of the host device. Although magnetic disk devices #1 to #4 are general-purpose magnetic disk devices sold to the user, test programs for executing the test/adjustment programs transferred from the host device are prestored within the ROM of each magnetic disk device. The data transmission path needs only to have a protocol structure which allows communication between the host device and magnetic disk devices #1 to #4, and may be constructed as, for example, an ATA (AT Attachment) bus, a SCSI bus, or a fiber channel. When the fiber channel is used, an arbitrated loop or a fabric switch may be employed.

The test/adjustment programs according to the present embodiment are characterized by the fact that they are split into multiple phases. The test/adjustment programs are split into multiple phases for the following reasons. The first reason is described below. Since the magnetic disk devices #1 to #4 that are to be tested/adjusted are in the state where the respective tests/adjustments are not completed, the magnetic disk devices may not operate their own heads to record any programs on the magnetic disks or to read any programs therefrom. Accordingly, the magnetic disks may not be used as storage locations for the test/adjustment programs transferred from the host device.

Data sizes of the test/adjustment programs which the magnetic disk devices may receive from the host device, therefore, are restricted by capacities of the respective RAMs. Hence, the host device makes execution of the test/adjustment programs in each magnetic disk device possible by temporarily storing each test/adjustment into the respective RAMs of each magnetic disk device, then splitting the test/adjustment program into a data size at which the CPU may execute the program, and sending this program. Thus, each magnetic disk device may execute the program.

The test/adjustment programs from the first phase to the fourth phase are executed inside each magnetic disk device in a self-executory manner. Therefore, since it is not possible, with the test/adjustment programs of the first to fourth phases alone, for the magnetic disk device to fully inspect the interface system for communicating with an external device, the command test mentioned above is required as the test/adjustment of the fifth phase.

Tests/adjustments based on the test/adjustment programs of the first to fourth phases are executed by each magnetic disk device in a self-executory manner without the host device being involved in execution of the programs. The test/adjustment of the fifth phase, however, is a command test performed when the host device and each magnetic disk device are communicating. Hence, splitting between the test/adjustment programs of the first to fourth phases and the test/adjustment program of the fifth phase is required since the host device and each magnetic disk device are the principal elements in execution of programs different in nature. Even if an increase in the capacity of each RAM makes it unnecessary to transfer the test/adjustment programs of the first to fourth phases in a form split from one another, the test/adjustment program of the fifth phase requires splitting from the test/adjustment programs of the first to fourth phases.

Multiple engineers specializing in various fields are involved when tests/adjustments are conducted. Dividing test/adjustment programs according to field may prove to be convenient in producing the programs and in evaluating test results. In addition, the magnetic disk devices containing the components that were found to be defective in test/adjustment steps may need to be urgently screened out before being shipped. In consideration of this, it is simpler to produce an independent special program for screening and transfer this screening program from the host device to each magnetic disk device as a test/adjustment program of a certain independent phase (for example, phase 2-1), than to incorporate the screening program into the test/adjustment program of any of the four phases described above. When screening becomes unnecessary, all that is required is only to delete the screening program from the test/adjustment program. In this way, during the tests/adjustments conducted in a self-executory manner under such environment as shown in FIG. 1, there is a need to transfer the test/adjustment programs in a split form or to split the tests/adjustments themselves into those conducted only in the magnetic disk device, and command tests.

Figure 2:
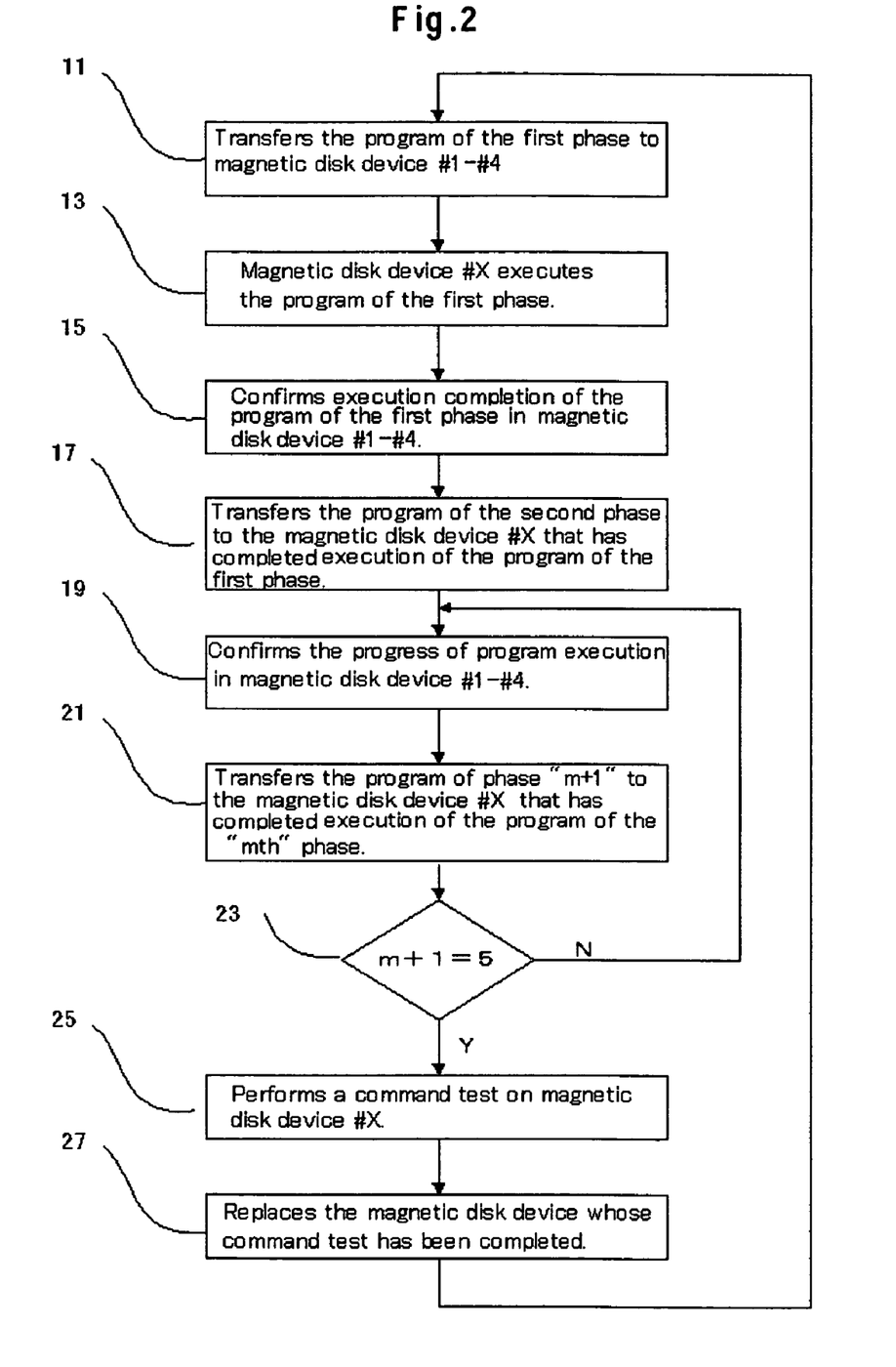
FIG. 2 is a flowchart explaining a basic method of tests/adjustments according to an embodiment of the present invention.

Next, a method for testing/adjusting of magnetic disk devices #1 to #4 under the environment shown in FIG. 1 is described below referring to FIG. 2. FIG. 2 is a flowchart explaining a basic method for self-executory testing/adjusting. The description here assumes that magnetic disk devices #1 to #4 are in the stage where no tests/adjustments are yet conducted. In block 11, the host device transfers the test/adjustment program of the first phase to magnetic disk devices #1 to #4.

Magnetic disk device #X that received the test/adjustment program of the first phase in block 13 (hereinafter, any one magnetic disk device from #1 to #4 is referred to as #X) stores the test/adjustment program into a RAM and makes a CPU execute the program. More specifically, the job of storing the test/adjustment program into the RAM and then making the CPU execute the program is performed by the test program stored within a ROM of the magnetic disk device. Magnetic disk device #X executes the test/adjustment program of the first phase and writes servo information on the magnetic disk of the magnetic disk device itself. Details of the servo information written, and a program for conducting head position control are included in the test/adjustment program of the first phase. In order to start test/adjustment program execution, the host device may send an execution starting command to the magnetic disk device after transferring the test/adjustment program of the first phase. Alternatively, each magnetic disk device may be constructed so that the test program stored within the ROM recognizes and automatically executes the test/adjustment programs of each phase.

In block 15, the host device detects that the test/adjustment program of the first phase has been executed to completion in magnetic disk device #X. Alternatively, the host device detects that a request for the test/adjustment program of the next phase is being issued from magnetic disk device #X. After the execution of the test/adjustment program of the first phase has been started in magnetic disk device #X, the host device does not send a new command or the test/adjustment program of the next phase before the execution of the above program is completed. The same also applies to execution of the test/adjustment programs of the second to fourth phases that are transferred in order after the test/adjustment program of the first phase has been executed to completion.

In order to make the host device detect that a request for the test/adjustment program of the next phase is being issued from magnetic disk device #X, magnetic disk device #X may send a completion command to the host device. Instead, magnetic disk device #X may set in its register the fact that program execution has been completed, and the host device may refer to the setting. These jobs are performed by the test program stored within the ROM of the magnetic disk device.

After completing the execution of the test/adjustment program of the first phase, magnetic disk device #X erases the program from the RAM and stands by to accept the test/adjustment program of the next phase. The operation of the magnetic disk device in this case is the same as that conducted following completion of execution of each test/adjustment program of the second to fourth phases. In block 17, the host device transfers the test/adjustment program of the second phase to the magnetic disk device #X that has completed the execution of the test/adjustment program of the first phase.

Magnetic disk device #X, after receiving the test/adjustment program of the second phase and storing the program into the RAM, starts execution of the test/adjustment program of the second phase, as in block 13. In block 19, the host device confirms the progress of test/adjustment program execution in each of magnetic disk devices #1 to #4. The confirmation of the progress of program execution refers to recognizing up to what phase the execution of the test/adjustment programs has been completed in each magnetic disk device at present, or recognizing the phase number of the test/adjustment program to be next transferred.

The host device determines the phase number of the test/adjustment program to be next transferred, by recognizing the phase number of the last test/adjustment program of all those which have been executed to completion up to now by magnetic disk device #X, and then calculating the phase number of the test/adjustment program to be next transferred, or by recognizing the phase number next requested from magnetic disk device #X after this phase number has been written directly into a register. More accurately, the determining job is performed by the test control program prestored within the host device. In block 21, the host device detects from magnetic disk devices #1 to #4 the last test/adjustment program of an "mth" phase of all programs whose execution has been completed up to now, or detects the test/adjustment program of phase "m+1" that is currently being requested following completion of execution of the test/adjustment program of the "mth" phase, and then transfers the test/adjustment program of phase "m+1" to the corresponding magnetic disk device #X.

In block 23, the host device confirms whether the phase number of the test/adjustment program next executed in each of magnetic disk devices #1 to #4 is 5. Phase 5 is a phase number of the last test/adjustment program. If m+1<5, block 19 or 23 is repeated and test/adjustment programs are transferred from the host device to magnetic disk devices #1 to #4, in order of the phase number, until the test/adjustment program of phase 5 has been requested from each of the four magnetic disk devices.

After judging in block 23 that m+1, the phase number of the test/adjustment program next executed by magnetic disk device #X, has become 5, the host device performs a command test of a fifth phase on magnetic disk device #X, in block 25. In block 27, magnetic disk device #X that has completed the command test is disconnected from the data transmission path, then a new magnetic disk device is connected, and tests/adjustments are performed using the same procedure. The test/adjustment programs of each phase are transferred to the new magnetic disk device in accordance with the phase number requested therefrom.

Test Control Apparatus with an ATA Interface

Figure 3:
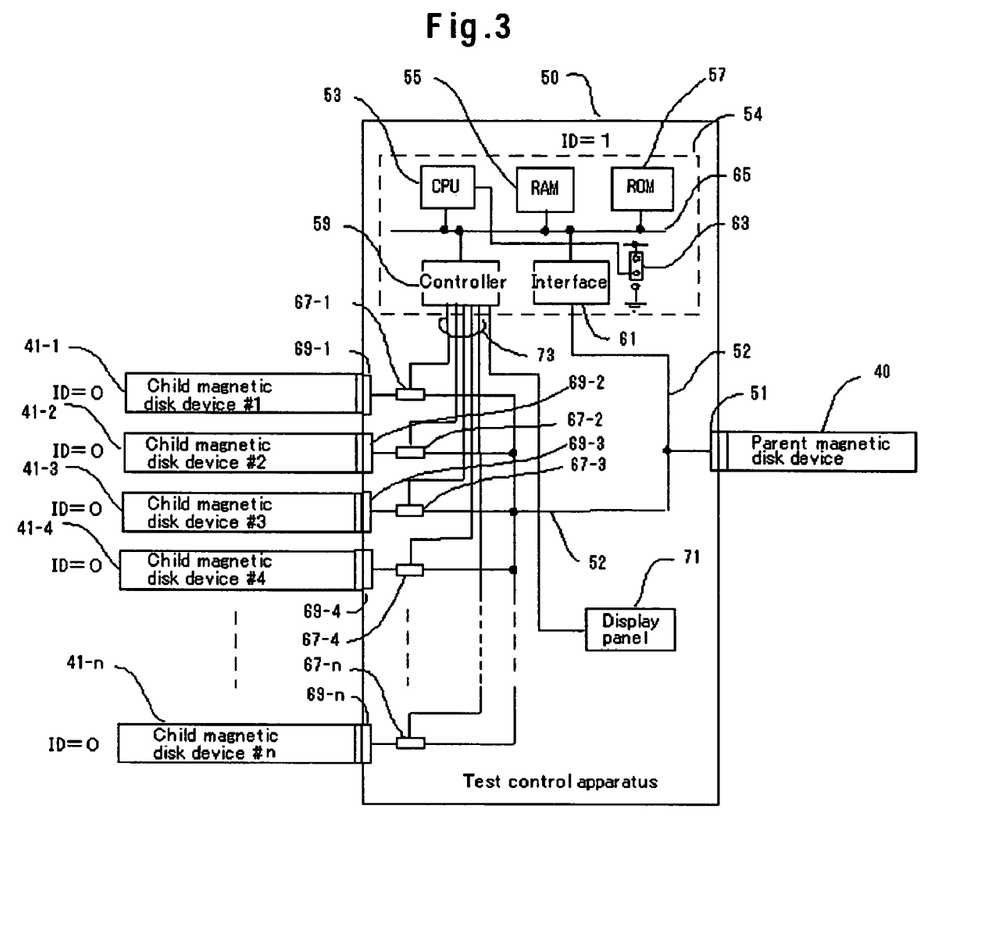
FIG. 3 is a diagram explaining a configuration of the test control apparatus conforming to ATA standards according to an embodiment of the present invention.

Next, a test control apparatus 50 for performing on ATA magnetic disk devices the tests/adjustments described above with reference to FIGS. 1 and 2 is described below referring to FIG. 3. In FIG. 3, the data transmission path in FIG. 1 is formed by the test control apparatus 50 and an "n" number of child magnetic disk devices 41-1 to 41-n to be tested/adjusted (hereinafter, these magnetic disk devices are referred to as child magnetic disk devices #1 to #n) and a parent magnetic disk device 40 functioning as a host device, are connected to the test control apparatus 50. An execution environment for test/adjustment programs is thus constructed.

Under ATA standards, only two magnetic disk devices, one a master and the other a slave, may be connected to one host controller. If the child magnetic disk devices tested/adjusted are to be connected directly to the parent magnetic disk device 40, only up to two such child magnetic disk devices may be connected. In this case, a large quantity of magnetic disk devices may not be tested/adjusted within a short time by using the parent magnetic disk device as the host device. This makes it impossible to ship one magnetic disk device while two magnetic disk devices are being tested/adjusted, and means a decrease in production volume. In the present embodiment, however, since an "n" number of child magnetic disk devices #1 to #n each employing an ATA interface (n>2 is possible) may be connected at a time to the test control apparatus 50, an "n" number of child magnetic disk devices may be tested/adjusted while one parent magnetic disk device 40 is being used for the tests/adjustments.

Although it is a tested/adjusted magnetic disk device that may be shipped as a product to a user, the parent magnetic disk device 40 is adapted to be operable in a host mode, and functions as the host device. The host mode refers to an operation mode in which the magnetic disk device operates similarly to a host computer, with respect to other magnetic disk devices. More specifically, the host mode refers to an operation mode in which the magnetic disk device actively accesses other magnetic disk devices and performs data read/write operations, adjustments, or the like, thereupon. In the host mode, the parent magnetic disk device functions as a bus master to autonomously control a bus of the data transmission path. In the present embodiment, there is, as another operation mode of magnetic disk devices, a device mode relative to the host mode. The device mode refers to an operation mode in which magnetic disk devices passively operates under commands from the parent magnetic disk device that operates as the host computer or in the host mode, and performs data read/write operations or adjustments.

In the device mode, each magnetic disk device functions as a bus slave to output data to the bus of the data transmission path, and to receive data from the bus, under the control of a bus mater. The device mode is the operation mode used by the user, and the host mode is a special operation mode adopted in the present embodiment in order to conduct tests/adjustments. The parent magnetic disk device 40 is set so that during tests/adjustments, it operates in the host mode, and when shipped as a product, it operates in the device mode. A structure of the magnetic disk devices operating in the host and device modes, and host mode/device mode selection are described later.

The test control apparatus 50 includes an ATA interface connector 51 for connection of the parent magnetic disk device 40, ATA interface connectors 69-1 to 69-n for connection of child magnetic disk devices #1 to #n, a bus controller 54, bus switches 67-1 to 67-n, and a display panel 71. A processor (CPU) 53 for controlling the operation of the test control apparatus 50, an involatile memory (ROM) 57 for storing the control program executed by the CPU 53, and a volatile memory (RAM) 55 for temporarily storing the control program and supplying a work region for the CPU 53, are connected to an internal bus 65 of the bus controller 54.

An interface 61 constituted by elements (such as an ATA register group and a built-in buffer) for exchanging commands, data, programs, and the like, with the parent magnetic disk device 40, and a controller 59 for generating control signals for the bus switches 67-1 to 67-n are also connected to the internal bus 65. The controller 59 is controlled by the CPU 53.

The ATA register group of the interface 61 contains an 8-bit Status register including a busy (BSY) bit, a data request (DRQ) bit, an error (ERR) bit, and other bits, a Command register for 8-bit command code writing, an 8-bit Device/Head register including a device selection (DEV) bit, and other registers.

The bus controller 54 has a jumper 63 that serves as a device setter for setting the test control apparatus 50 as either a master or a slave. The jumper 63 is connected to the CPU 53. Changing a connecting position of a jumper block allows the jumper 63 to apply to the CPU 53 a constant potential which takes a logical value of 1, or a grounding potential which takes a logical value of 0. Thus, the jumper 63 makes the test control apparatus 50 self-recognize whether it is a master or slave under the ATA standards. In the present embodiment, the jumper 63 is set to logical 1 to operate the test control apparatus 50 as a slave (ID=1). In addition, all child magnetic disk devices #1 to #n have the same jumper block mounted to set each as a master (ID=0).

When the parent magnetic disk device 40 sets up 1 at the DEV bit position in the Device/Head register provided in the interface 61, and sends a command to the test control apparatus 50, the CPU 53 confirms that the logic given from the jumper 63 and the logic of the DEV bit agree, thus recognizes that the CPU itself is the element to be accessed, and executes the command. At this time, a DEV bit of a Device/Head register in child magnetic disk device #X associated with a bus switch placed in a closed state is also set to 1. The processor in child magnetic disk device #X, however, ignores the command since the logic set by the jumper block and the logic of the DEV bit do not match.

When the parent magnetic disk device 40 sets up 0 at the DEV bit position in the Device/Head register of child magnetic disk device #X in order to send a command thereto, the DEV bit in the Device/Head register of the interface 61 is also set to 0. However, the CPU 53 refers to the setting of the jumper 63, thus recognizes that the CPU itself is not selected, and ignores the command.

An ATA cable 52 is connected to the ATA interface connector 51 at one end and is connected to the interface 61 at the other end. The ATA cable 52 connected to the interface connector 51 is further branched into an "n" number of lines halfway, each of these lines being connected to one of the bus switches 67-1 to 67-n. The bus switches 67-1 to 67-n are connected to the ATA interface connectors 69-1 to 69-n, respectively. Control lines 73 are also connected from the controller 59 to the bus switches 67-1 to 67-n, respectively. The operation of the bus switches 67-1 to 67-n may be controlled by applying a voltage to each of the control lines 73.

The controller 59 has a connected display panel 71 for displaying a test/adjustment program execution state. Display of the execution state includes at least displaying the phase numbers of the test/adjustment programs currently being executed by child magnetic disk devices #1 to #n, displaying the occurrence of an error (if detected during program execution), and displaying completion of the child magnetic disk device tests/adjustments.

Description of the Magnetic Disk Device

Figure 4:
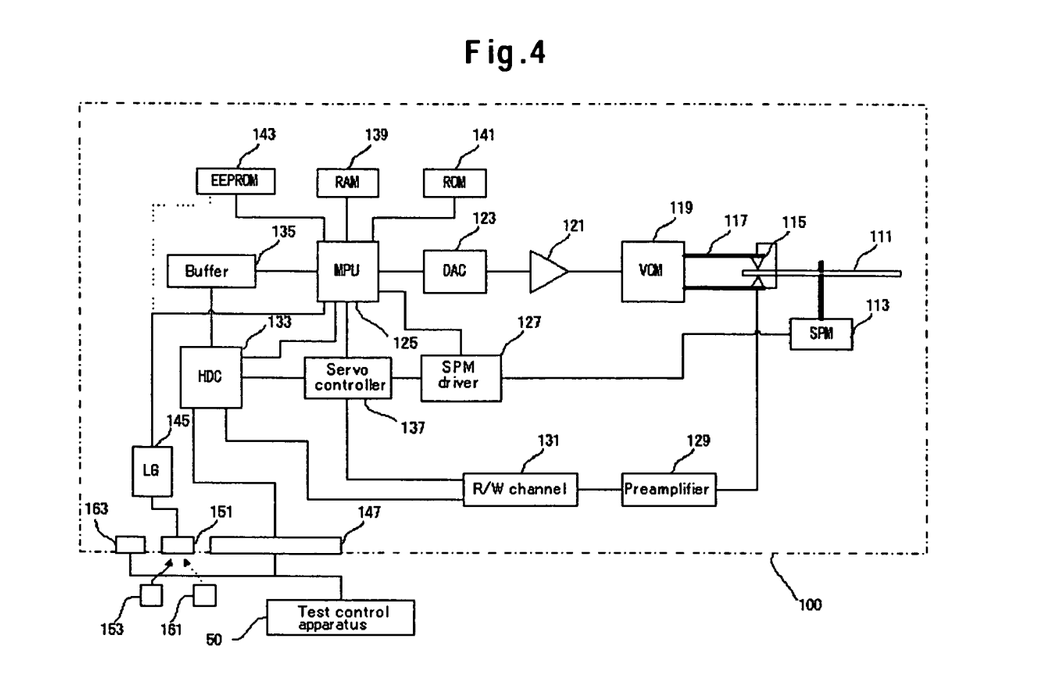
FIG. 4 is a block diagram showing a major hardware configuration of a magnetic disk device according to an embodiment of the present invention.

FIG. 4 is a block diagram showing a major hardware configuration of a magnetic disk device 100 operable as the parent magnetic disk device 40 or child magnetic disk device 41#. The magnetic disk device 100 has an ATA interface connector 147 and a magnetic disk 111, and conforms to ATA interface standards. The magnetic disk device 100, when in the state where it may be shipped as a product that has undergone the tests/adjustments according to the present embodiment, may be operated as the parent magnetic disk device 40 by storing the test/adjustment programs of the first to fifth phases and the test control program onto the magnetic disk 111 and then setting the magnetic disk device 100 to the host mode. When in the state where it is tested/adjusted, the magnetic disk device 100 may be operated as child magnetic disk device #X (hereinafter, the #X symbol is used to denote any child magnetic disk device) by setting the magnetic disk device 100 to the device mode. A host mode/device mode selection method for the magnetic disk device 100 is described later.

The magnetic disk 111 as a recording medium, has on both sides a recording surface formed of a magnetic layer, and this magnetic disk is installed on a spindle hub in the form of a laminated structure with one or more layers and rotated by a spindle motor (SPM) 113. On the magnetic disk 111 are provided a user region supplied as a data/program storage location to the user, and a system region used as a system of the magnetic disk device. The user may not write/read data into/from the system region. After completion of tests/adjustments, test/adjustment programs, a test control program, and a host mode execution program are stored into the system region so that the magnetic disk device may be operated as the parent magnetic disk device with respect to other magnetic disk devices.

Independent heads 115 for recording and reproduction each are provided on a slider. A head of the type that functions as both a recording head and a reproducing head, may be used instead. However, test/adjustment program contents change according to the type of head used. An actuator assembly 117 rotationally moves supporting the head 115, and positions the heads 115 onto required tracks of the magnetic disk 111. A voice coil motor (VCM) 119 is constituted by a voice coil on which the actuator assembly 117 is mounted, and a voice coil, and a voice coil yoke, both installed on a base of the magnetic disk 111. The VCM 119 changes a current to be supplied to the voice coil, and conducts operation control of the actuator assembly 117.

A VCM driver 121 receives a voltage signal from a digital analog converter (DAC) 123 and converts the voltage signal into a driving current of the VCM 119. The DAC 123 receives from a micro-processing unit (MPU) 125 a digital signal for positioning the head 115, and converts the digital signal into an analog voltage signal. A spindle motor driver (SPM driver) 127 has an AD converter, and the SPM driver 127, after receiving a digital signal from the MPU 125, converts the digital signal into a driving current of the SPM 113. A preamplifier 129 amplifies a very weak analog reproducing signal that the head 115 reproduced from the magnetic disk 111 during reproduction, and sends the reproducing signal to a read/write channel (R/W channel) 131. The preamplifier 129 also amplifies an analog write signal that was received from the R/W channel 131 during recording, and outputs the analog write signal to the head 115.

The R/W channel 131 conducts data processing for recording or reproduction. The R/W channel 131 receives via a hard-disk controller (HDC) 133 the writing digital data that was sent from an external device to the magnetic disk 100. The R/W channel 131 converts received digital data into a writing current and sends the current to the preamplifier 129. Furthermore, the R/W channel 131 converts into digital data the reproducing signal of the head 115 that was sent from the preamplifier 129 to the R/W channel 129, and sends the digital data to the external device via the HDC 133. The external device referred to in the SPECIFICATION means a magnetic disk device (other than the magnetic disk device 100), the test control apparatus 50, the host device, or the like. A servo controller 137 extracts head position information from the readout data that the R/W channel 131 outputs, and then sends the head position information to the MPU 125 and the HDC 133.

The HDC 133 functions as an interface for communication with the external device, and adjusts a data transfer rate with respect to the external device and an internal data-processing rate of the magnetic disk device 100. The HDC 133 temporarily stores into a buffer 135 the transfer data that has been received from the external device, and sends the data to the R/W channel 131 in accordance with a command of the MPU 125. Additionally, the HDC 133 temporarily stores into the buffer 135 the transfer data that has been received from the R/W channel 131, and sends the data to the external device in accordance with a command of the MPU 125. The HDC 133 further has a data error correction circuit, an address mark detection circuit, and others.

The HDC 133 has ATA registers for data communication with the external device. The ATA registers include various registers for receiving commands, data, and others from the parent magnetic disk device 40 when the magnetic disk device 100 operates as child magnetic disk device #X in the device mode, and for sending commands, data, and others to child magnetic disk device #X when the magnetic disk device 100 operates as the parent magnetic disk device 40 in the host mode.

The MPU 125 cooperates with the HDC 133 to provide total operation control of the magnetic disk device 100. The MPU 125 directly accesses the ATA registers of the HDC 133 and controls data exchange with the external device. Since the MPU 125 according to the present embodiment operates in the host mode as well as in the device mode, the MPU 125 is adapted to be able to execute the host mode execution program and send commands and data to the external device.

The MPU 125 also has a state register for judging whether the MPU is to operate in the host mode or in the device mode. The MPU 125 converts the logical block address (LBA) of the magnetic disk 111 that has been sent from the external device to the magnetic disk device 100, into a physical block address (PBA). In addition, the MPU 125 judges a position of the magnetic head 115 in accordance with the servo information that the servo controller 137 sent to the MPU 125, and sends to the DAC 123 a digital signal for moving the head 115 to a target position in accordance with the difference therefrom that has been calculated from the address indicated from the external device.

A read-only semiconductor memory (ROM) 141 stores the firmware provided for the MPU 125 to control the basic operation of the magnetic disk device 100. The ROM 141 also stores the test program provided for the magnetic disk device 100 to receive and execute a test/adjustment program by operating as a child magnetic disk device. A random-access memory (RAM) 139 temporarily stores a program that the MPU 125 executes, and operates as the main storage device used as a work region of the MPU 125. An electrically erasable programmable ROM (EEPROM) 143 stores characteristic information on the magnetic disk device 100, such as a model name, serial number, firmware version number, the protocol used, and manufacturer name, and information on power management and on a read or write cache, a read or write buffer, and others.

The EEPROM 143 may also store an event flag indicating whether the magnetic disk device 100 is to be operated in the host mode or in the device mode, and an address or identifier of a child magnetic disk device to which test/adjustment programs are to be transferred. In addition, the EEPROM 143 stores a PDM (primary defect map) for registration of the defective sectors detected during execution of the test/adjustment programs, and position information on tracks.

A special jumper block 153, a general-purpose jumper block 161, a jumper connector 151, and a logic gate 145 constitute an operation mode setter for selecting the host mode or device mode for the magnetic disk device 100. Settings of the operation mode setter are incorporated into the state register of the MPU 125. The MPU is constructed so that when power is turned on, the MPU always refers to the state register. When power is turned on, the magnetic disk device judges whether it is to operate in the host mode or in the device mode. When the magnetic disk device self-recognizes that it is to operate in the host mode, the magnetic disk device reads the host mode execution program out from the magnetic disk 111 and operates in the host mode.

Furthermore, when a configuration is adopted that sets in the EEPROM 143 an event flag relating to the operation mode, the EEPROM 143 constructs an operation mode setter. A jumper block is typically configured so as to electrically strap specific jumper pins by connecting a jumper connector equipped with multiple jumper pins. The user may mount the general-purpose jumper block 161 at the jumper connector 151, operate the magnetic disk device 100 in the device mode, and perform various setup operations.

Figure 5:
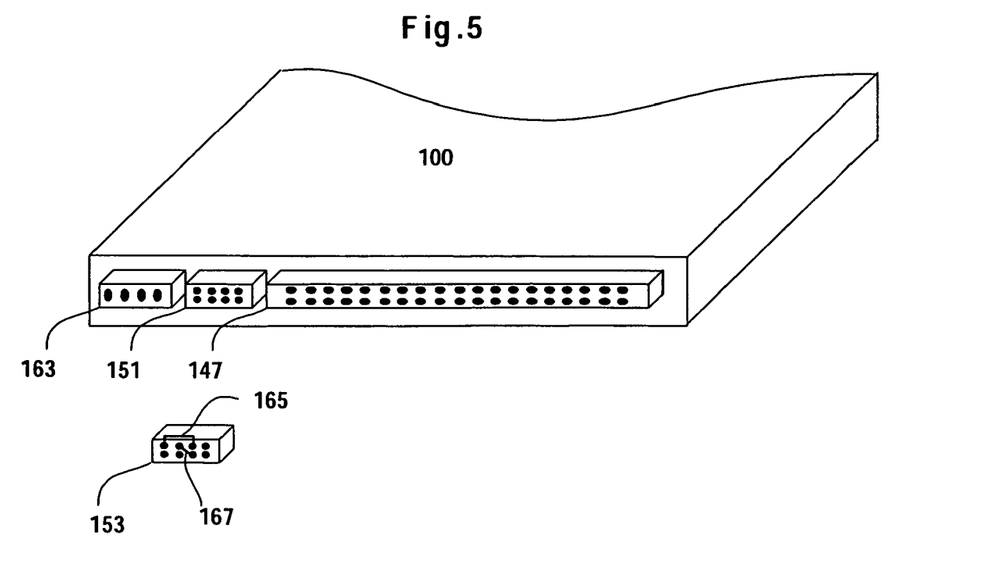
FIG. 5 is a diagram explaining a jumper configuration of the magnetic disk device according to an embodiment of the present invention.

For example, it is possible to select the jumper pins to be electrically strapped, and perform master/slave setup, security function enable/disable setup, capacity limit setup, and other various function setup operations. The special jumper block 153 according to the present embodiment may be mounted at the jumper connector 151 of the magnetic disk device 100, alternatively to the general-purpose jumper block 161. The special jumper block 153 takes a special pin configuration for forming an electrically strapped jumper pin-to-pin state, the special pin configuration not being adopted for the general-purpose jumper block 161. The special pin configuration allows the special jumper block 153 to operate the magnetic disk device 100 in the host mode and to give instructions for function selection in the host mode. A perspective view of the jumper connector 151, the ATA interface connector 147, and the jumper block 153, is shown in FIG. 5. The jumper block 153 shown in FIG. 5 may be configured so as to electrically strap pins located across another pin, as denoted by reference number 165, or may be configured so as to electrically strap pins obliquely arranged, as denoted by reference number 167.

Such a jumper block configuration is not to be adopted for the general-purpose jumper block 161 supplied to the user. The host mode is an operation mode that the user does not use, and unless the user uses the special jumper block 153, the user may not set up any function working as the host mode. A DIP switch may be used instead of a jumper connector. Although a DIP switch is convenient in that it allows an operation mode to be set up easily, an element such as a cover for preventing mis-operations is required. Furthermore, as shown in FIGS. 4 and 5, a power supply connector 163 for supplying power to the magnetic disk device 100 is provided next to the jumper connector 151.

Connector pins of the jumper connector 151 are connected to the logic gate 145. The logic gate 145 is formed up of an AND gate, an OR gate, a NAND gate, and others, receives the connector pin-to-pin short state formed in the special jumper block 153 or in the general-purpose jumper block 161, and the logic state formed in an open state. Additionally, the logic gate 145 constructs a new logic state and outputs the new logic state to an I/O port of the MPU 125. An output of the logic gate 145 may be sent to the MPU 125 via the HDC 133. A logic state is sent from the I/O port of the MPU 125 as a pull-up state or pull-down state of the wiring connected from the logic gate 145 to the I/O port. The above results in the same state as a state in which specific data has been written into the state register of the MPU 125.

It may be possible to connect the jumper connector 151 directly to the I/O port of the MPU 125, instead of adopting the logic gate 145. However, since the logic gate 145 functions as a decoder, adoption of the logic gate 145 makes it possible to set up more functions that operate in the host mode, for the MPU 125. Furthermore, those details of the event flag relating to operation mode setup that were written into the EEPROM 143 may be taken as an input of the logic gate 145 or a direct input of the I/O port of the MPU 125.

Constructing an operation mode setter using the EEPROM 143 improves flexibility of function setup since details of the event flag may be modified from an external host device. Alternatively, functions may be set up by combining the event flag of the EEPROM 143 and the logic state of the logic gate 145. The fact that a number of functions may be set up provides convenience in that when tests/adjustments are conducted, detailed functions may be set up by operating the magnetic disk device 100 as the parent magnetic disk device 40, executing a test control program, transferring test/adjustment programs to child magnetic disk device #X, and executing command tests. Wrong setup of the event flag by the user may be prevented by adopting such a configuration that issues a password request when the event flag of the EEPROM 143 is written in from the external device.

An example of the hardware configuration of the magnetic disk device 100 according to the present embodiment has been described heretofore. The names, functions, mutual relationship, and other factors of each block described above with reference to the relevant drawings are only an example. The theory, philosophy, or ideas of the present invention are not limited to or by these examples, and adding other functions, realizing the same function in different blocks, and splitting or integrating blocks are included in the scope of the present invention as far as a person skilled in the art may perform the above with reference to the SPECIFICATION.

Test/Adjustment Procedures on the ATA Magnetic Disk Devices

Figure 6:
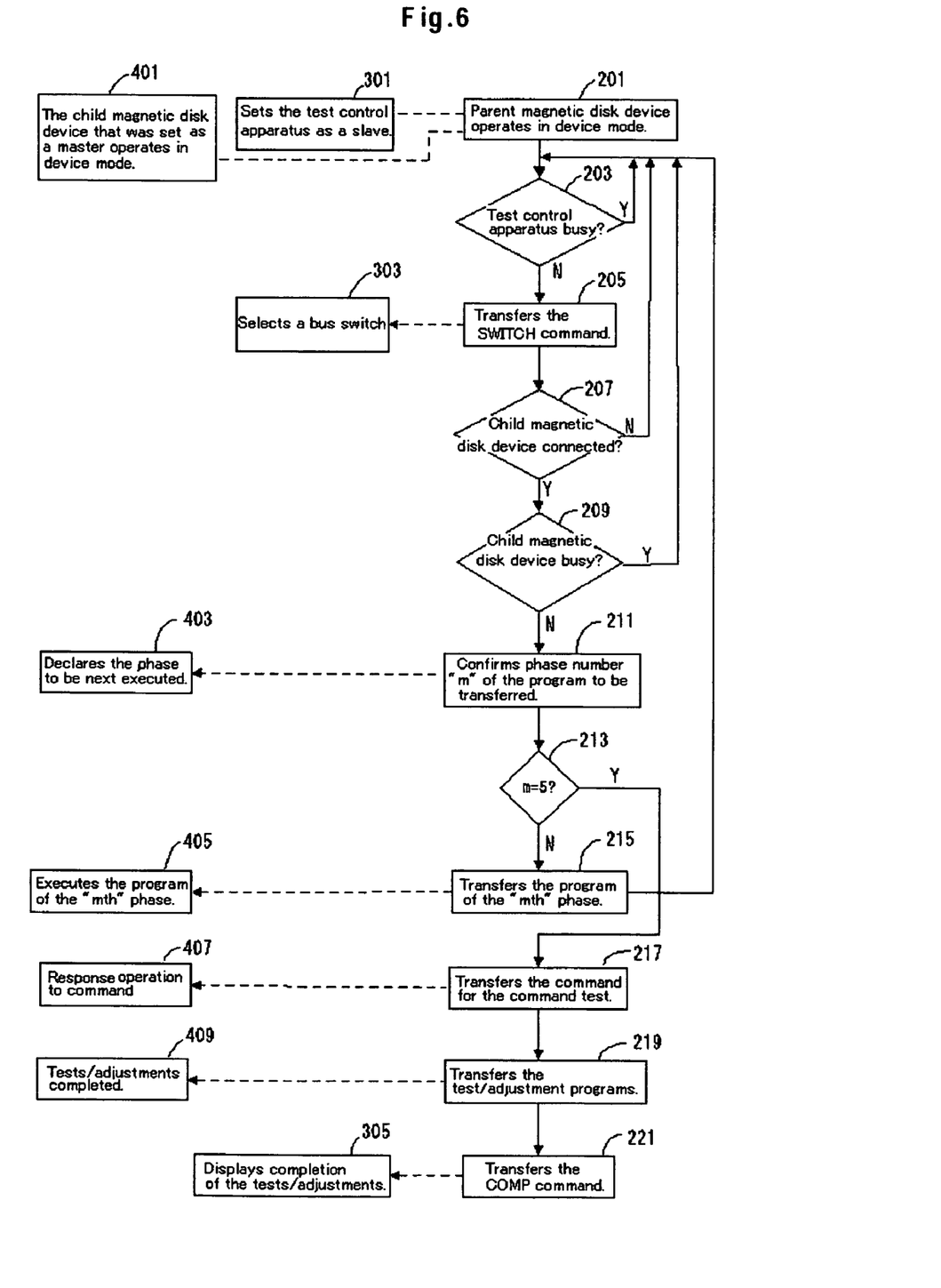
FIG. 6 is a flowchart explaining the test/adjustment method using the test control apparatus according to an embodiment of the present invention.

Next, a method of testing/adjusting child magnetic disk devices #1 to #n by connecting the parent magnetic disk device 40 and child magnetic disk devices #1 to #n to the test control apparatus 50 is described below referring to FIG. 6. In the following description, when any one of the multiple child magnetic disk devices from #1 to #n is referred to, the child magnetic disk device is referred to as child magnetic disk device #X. Any one of multiple ATA interface connectors from 69-1 to 69-n and any one of multiple bus switches from 67-1 to 67-n are likewise referred to as 69-X and 67-X, respectively. Major components of the parent magnetic disk device 40 and of child magnetic disk device #X are the same as the major components of the magnetic disk device 100 in FIG. 4. In FIG. 6, blocks 201 to 221 denote a procedure that the parent magnetic disk device 40 uses to conduct tests/adjustments, blocks 301 to 305 denote relative operation of the test control apparatus 50 with respect to the operation of the parent magnetic disk device 40, and blocks 401 to 409 denote relative operation of the child magnetic disk device with respect to the operation of the parent magnetic disk device 40.

In block 201, the special jumper block 153 is mounted in the parent magnetic disk device 40. In block 301, the jumper 63 of the test control apparatus is set to a slave (ID=1), and in block 401, the general-purpose jumper block 161 is mounted in child magnetic disk devices #1 to #n. The parent magnetic disk device 40 is connected to the interface connector 51, child magnetic disk devices #1 to #n are connected to the interface connectors 69-1 to 69-n, and each magnetic disk device is powered on. At this time, not all interface connectors 69-1 to 69-n need to be connected to child magnetic disk devices #1 to #n, and any interface connector may remain idle.

The general-purpose jumper block 161 is configured so as to have a function for setting up a master (ID=0) for any of the multiple child magnetic disk devices from #1 to #n, as well as for a function for operating that child magnetic disk device in the device mode. Settings of the special jumper block 153 and of the general-purpose jumper block 161 are incorporated into the state register of the MPU 125 through the logic gate 145. When power is turned on, the MPU always refers to the state register. When power is turned on, therefore, the parent magnetic disk device 40 reads the host mode execution program out from the magnetic disk 111 into the RAM 139 and operates in the host mode, whereas any child magnetic disk device from #1 to #n executes the ROM-stored firmware and operates in the device mode, the same operation mode as used for the user.

The test control apparatus 50 that has been set as a slave, ignores any received commands unless 1 is subsequently set up at the DEV bit position in the Device/Head register by the parent magnetic disk device 40. Child magnetic disk device #X that has been set as a master, ignores any received commands unless 0 is subsequently set up at the DEV bit position in the Device/Head register by the parent magnetic disk device 40. As with those described in FIGS. 1 and 2, test/adjustment programs are formed up of a first phase to a fifth phase and are stored in the system region of the magnetic disk 111 provided in the parent magnetic disk device 40.

After the above, in block 203, the parent magnetic disk device 40 executes a device selection protocol for ATA and confirms whether the test control apparatus 50 is in an idle state. The parent magnetic disk device 40 sets up 1 at the DEV bit position in the Device/Head register and addresses the test control apparatus 50. After this, the parent magnetic disk device 40 specifies an address of the Status register and reads the BSY bit in the Status register of the test control apparatus. At this time, if 0 is set up at the BSY bit, this indicates that the test control apparatus 50 is in a idle state, or if 1 is set up, the test control apparatus is in a busy state. If the test control apparatus is busy, the device selection protocol will be repeated until the test control apparatus has become idle.

The busy state of the test control apparatus 50 indicates that since the bus controller 54 is selecting a bus switch, the bus controller may not receive commands from the parent magnetic disk device 40. After confirming that the test control apparatus 50 is idle, the parent magnetic disk device 40 sends a signal to the ATA cable 52 in block 205 such that 1 is set up at the DEV bit position in the Device/Head register of the interface 61. With reference to the bus switches 67-1 to 67-n, if the bus switch 67-n only is now in a closed state and all others are open, 1 is also set up at the DEV bit position in the Device/Head register of child magnetic disk device #n.

Since the jumper 63 of the test control apparatus 50 is set to logical 1 (ID=1) beforehand to operate as a slave, the CPU 53 checks the DEV bit in the Device/Head register and the logic state of the jumper 63 and recognizes that the CPU 53 itself has been selected. Meanwhile, since child magnetic disk device #n is set to logical 0 (ID=0) beforehand to operate as a master, child magnetic disk device #n does not recognize that the child magnetic disk device itself has been selected, and ignores any received commands.

Next, the parent magnetic disk device 40 sends a SWITCH command, a vendor-specific ATA command, to the Command register of the interface 61. The SWITCH command is a command that the CPU 53 may execute under the control program stored within the ROM 57. At this time, although the SWITCH command is also written into a Command register of child magnetic disk device #n, this command is ignored since child magnetic disk device #n is not selected.

In block 303, the test control apparatus 50 executes the SWITCH command and selects a bus switch. The control program is constructed so as to close only one of the multiple bus switches 67-1 to 67-n. When executing the SWITCH command, the CPU 53 opens the bus switch 69-X placed in a closed condition and then controls the controller 59 so as to close bus switch 69-X+1 of an adjacent number in predetermined order. In the present embodiment, the control program is constructed such that each bus switch is cyclically selected in order from 67-1 to 67-*n* first and then backward from 67-*n* to 67-1.

If the bus switch 67-*n* only is now in a closed state, the controller 59, in response to a command from the CPU 53, "disables" a control line 73 associated with the bus switch 67-*n* that is currently in an "enabled" state, and "enables" a control line 73 associated with the bus switch 67-1. Consequently, the number of the bus switch in a closed state changes by one to indicate that a new communications path has been established between the parent magnetic disk device 40 and child magnetic disk device #1. In block 303, the test control apparatus 50, after selecting the appropriate control line 73, sets up the appropriate bit in the Status register of the interface 61 to indicate that the selection has been completed. By reading the setting, the parent magnetic disk device 40 recognizes completion of the selection and prepares to access child magnetic disk device #1.

After this, the parent magnetic disk device 40 confirms in block 207 whether a child magnetic disk device is connected to the interface connector 69-1. If the parent magnetic disk device 40 judges a child magnetic disk device not to be connected to the interface connector 69-1, the parent magnetic disk device 40 returns to block 203 and executes the device selection protocol to the test control apparatus 50. After this, the parent magnetic disk device 40 sends the SWITCH command and conducts control to select the bus switch 69-2 of an adjacent number. In order to allow confirmation of whether a child magnetic disk device is connected to the interface connector 69-X, a configuration is taken that "pulls up" or "pulls down" a signal line of the ATA cable which a vendor is permitted to define in the child magnetic disk device. Thus, when the bus switch 67-X is closed, the parent magnetic disk device 40 may confirm whether the corresponding signal line is present.

Control is transferred to block 209 if the child magnetic disk device #X is connected to the interface connector 69-X. In block 209, the parent magnetic disk device 40 selects child magnetic disk device #X by addressing the Device/Head register and setting up 0 at the DEV bit position. Additionally, the parent magnetic disk device 40 executes the device selection protocol and confirms whether child magnetic disk device #X is busy or idle. Although all child magnetic disk devices #1 o #*n* are slaves (ID=1), since only the bus switch 67-X is closed, the parent magnetic disk device 40 makes reference only to the Status register of child magnetic disk device #X.

If 1 is set up at the BSY bit position in the Status register, since this means that child magnetic disk device #X is busy, the parent magnetic disk device 40 returns to block 203, in which it then performs the device selection protocol on the test control apparatus 50 once again and sends the SWITCH command to select an appropriate bus switch. If 0 is set up at the BSY bit position in the Status register, since this means that child magnetic disk device #X is idle, the parent magnetic disk device 40 proceeds to block 211, in which it then confirms the phase number of the test/adjustment program requested from child magnetic disk device #X.

In block 403, during an initial stage of the test/adjustment process, child magnetic disk device #X sets up in its Status register the bit that identifies the test/adjustment program of the first phase, requested with respect to the parent magnetic disk device 40. When execution of the test/adjustment program of the first phase is completed, child magnetic disk device #X erases this program from the RAM and then receives the test/adjustment program of the second phase from the parent magnetic disk device 40 to prepare for storing this program into the RAM. For this purpose, child magnetic disk device #X explicitly declares its idle state by setting up 0 at the BSY bit position in the Status register, and then sets up in the Status register the bit for identifying 2, the phase number of the test/adjustment program which the parent magnetic disk device 40 is to next transfer. The bit set up in the Status register may be the bit indicating the phase number of the test/adjustment program which has already been completed at that time, or the bit indicating the phase number of the test/adjustment program next requested.

Execution time of the test/adjustment programs of each phase changes according to particular manufacturing characteristics of magnetic disk device #X. Therefore, it is not predetermined which child magnetic disk device first completes the test/adjustment programs of each phase. In block 403, one child magnetic disk device from #1 to #*n* sets up in the Status register the bit that identifies the phase number of the test/adjustment program next requested when the execution of the previous test/adjustment program is completed, and stands by for the appropriate bus switch to be selected by the parent magnetic disk device 40 after being closed.

The parent magnetic disk 40, after referring to the Status register and confirming that the phase number of the test/adjustment program next requested from child magnetic disk device #X is "m", moves to block 213 and judges whether the phase number "m" is phase number 5 of the command test. If the phase number "m" is 4 or less, the parent magnetic disk 40 moves to block 215. In block 215, the parent magnetic disk 40 transfers the test/adjustment program of the "mth" phase to child magnetic disk device #X and then further transfers START, a vendor-specific ATA command, thus instructing child magnetic disk device #X to start execution of the test/adjustment program of the "mth" phase.

In block 405, child magnetic disk device #X may not use the magnetic disk to store the test/adjustment program of the "mth" phase. The test/adjustment program of the "mth" phase, however, is constructed to have such a data size that allows storage into the RAM. Therefore, the MPU in child magnetic disk device #X executes the ROM-stored test/adjustment program and stores the test/adjustment program of the "mth" phase into the RAM. Furthermore, child magnetic disk device #X receives the START command from the parent magnetic disk device 40 and starts to execute the test/adjustment program of the "mth" phase. While executing the test/adjustment program of the "mth" phase, child magnetic disk device #X sets up 1 at the BSY bit position in the Status register, thus explicitly declaring that the child magnetic disk device itself is currently in a busy state.

After transferring the test/adjustment program of the "mth" phase to child magnetic disk device #X and then sending the START command, the parent magnetic disk device 40 returns to block 203, transfers the test/adjustment programs of the phase numbers requested from other child magnetic disk devices, and instructs execution of the programs. For this purpose, The parent magnetic disk device 40 repeats the procedure from blocks 203 to 215. More specifically, the parent magnetic disk device 40 sends SWITCH commands in sequence to the test control apparatus 50, selects the appropriate bus switches, and detects the idle child magnetic disk device. The parent magnetic disk device 40, after detecting that the child magnetic disk device is idle, reads the corresponding Status register, recognizes the number of the test/adjustment program to be next requested, transfers this program, and further transfers the START command. At this time, when the interface connector is idle or when the setting of the BSY bit in the Status register of the child magnetic disk device is 1, these are detected and after a return to block 203, SWITCH commands are sent to the test control apparatus 50 once again.

In this way, the test/adjustment programs of the first to fourth phases are transferred in order of the phase number to child magnetic disk devices #1 to #n each connected to the test control apparatus 50 through blocks 203 to 215, and each such program is executed in each child magnetic disk device. While child magnetic disk device #X is executing the test/adjustment programs of the first to fourth phases, the parent magnetic disk device 40 does not need to communicate with child magnetic disk device #X. Tests/adjustments may therefore be performed in the format where the test/adjustment programs are transferred to the multiple child magnetic disk devices #1 to #n and simultaneously executed.

If in block 213, the parent magnetic disk device 40 detects that the test/adjustment program next requested from child magnetic disk device #X, any one of the multiple child magnetic disk devices #1 to #n, is of the fifth phase, transfers a command test execution command to child magnetic disk device #X. The command test is conducted when the parent magnetic disk device 40 executes the test/adjustment program of the fifth phases, transfers the command to child magnetic disk device #X, and confirms the contents of each register or reads out data.

During the command test, the parent magnetic disk device 40 sends to child magnetic disk device #X the read/write commands that assume a usage state of the user's magnetic disk device, and confirms whether the desired/required operations are to be conducted. For example, data is written using the write command, and then the written data is read using the read command. Child magnetic disk device #X executes each command in block 407 and sets execution results in various registers or writes data into the buffer. The parent magnetic disk device 40 confirms the ERR (error) bit in the Status register or confirms the bit in an Error register, thus verifying whether an error is occurring in child magnetic disk device #X. Also, the written data and the read data are checked for matching.

Execution of command tests makes it possible to perform inspections under a state close to the operating environment of the user's magnetic disk device, including the interface system of child magnetic disk device #X, and hence to enhance quality assurance capabilities. After a command test on one child magnetic disk device #X has been started, the parent magnetic disk device 40 does not issue a SWITCH command to the test control apparatus 50 until the command test has been executed to completion. Child magnetic disk device #X whose command test was completed in block 217 is already assigned a complete product function so that the magnetic disk device may be shipped.

In block 219, the parent magnetic disk device 40 transfers the test/adjustment programs stored within the system region of its own magnetic disk, the test control program, and the host mode execution program, to child magnetic disk device #X whose command test was completed. In block 409, child magnetic disk device #X stores each such program into the system region of the local magnetic disk, thus completing tests/adjustments. Therefore, child magnetic disk device #X next functions as a new parent magnetic disk device, and becomes able to perform tests/adjustments on other child magnetic disk devices. The procedure of bock 219 is not necessary when child magnetic disk device #X is to be shipped to a market in the format where the child magnetic disk device is not used as a parent magnetic disk device.

After test/adjustment program transfer, the parent magnetic disk device 40 sends a COMP (complete) command that is a vendor-specific ATA command, to the test control apparatus 50, in block 221. In block 305, the test control apparatus 50 displays completion of the tests/adjustments on the display panel 71. More specifically, the COMP command is executed by the CPU 53 of the test control apparatus 50, whereby the CPU 53 recognizes the number 67-X of the bus switch currently in a closed state and displays on the display panel 71 the fact that the tests/adjustments on child magnetic disk device #X connected to an associated ATA interface connector have been completed. In this case, "67-X Test/Adjustment Completed", for example, is displayed. Since child magnetic disk devices #1 to #n do not have their specific identifiers, these magnetic disk devices are each identified by the number of the closed bus switch.

If an error occurs in child magnetic disk device #X during execution of any test/adjustment program from the first phase to the fourth phase, child magnetic disk device #X stops the execution of the program, explicitly declares this state to the parent magnetic disk device 40, and sets up 0 at the BSY bit position in the Status register. In order for the occurrence of an error to be explicitly declared to the parent magnetic disk device 40, a configuration is taken that "pulls up" or "pulls down" the signal line of the ATA cable which the vendor is permitted to define. Thus, when the bus switch for the corresponding magnetic disk device is closed, the parent magnetic disk device 40 may confirm the corresponding signal line. Alternatively, the appropriate bit in the Status register or EEPROM register may be set to allow the above declaration.

After confirming that the error has occurred in child magnetic disk device #X, the parent magnetic disk device 40 sends an error command that is a vendor-specific ATA command, to the test control apparatus 50. By executing the error command, the CPU 53 in the test control apparatus 50 recognizes that the error has occurred in the child magnetic disk device connected to an interface connector associated with the number of the bus switch currently in a closed state. Accordingly, the CPU 53 makes an error display on the display panel 71 by controlling the controller 59. The error display on the display panel 71 is, for example, "67-X Error."

When transferring any test/adjustment program of the first to fifth phases to child magnetic disk device #X, the parent magnetic disk device 40 may notify to the test control apparatus 50 the phase number of the test/adjustment program to be transferred. This makes the test control apparatus 50 able to recognize that child magnetic disk device #X to which the program is to be transferred is the bus switch 67-X currently in a closed state, and thus to recognize that child magnetic disk device #X connected to the interface connector 69-X is executing the test/adjustment program of that phase number. By using the corresponding information, the test control apparatus 50 may display the number of the bus switch and the phase number of the transferred test/adjustment program, on the display panel 71. Thus, the progress of test/adjustment program execution in magnetic disk devices #1 to #n may also be displayed. Display of the progress of program execution is, for example, "67-X Phase 3".

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for testing/adjusting a rotating-disk-type storage device connected to a host device via a data transmission path, the method comprising:
   the host device transferring the test/adjustment program of a first phase that is stored within the host device, to the rotating-disk-type storage device;
   the rotating-disk-type storage device executing the test/adjustment program of the first phase;
   the host device detecting that the rotating-disk-type storage device is requesting a transfer of the test/adjustment program of a second phase that is stored within the host device; and
   in response to the request in the detecting, the host device transferring the test/adjustment program of the second phase to the rotating-disk-type storage device.

2. The testing/adjusting method according to claim 1, wherein the host device is a magnetic disk device operating in a host mode.

3. The testing/adjusting method according to claim 1, wherein the test/adjustment program of the first phase includes a program for writing servo information into the rotating-disk-type storage device.

4. The testing/adjusting method according to claim 1, wherein the test/adjustment program of the second phase includes a program for sending a command from the host device to the rotating-disk-type storage device and causing the rotating-disk-type storage device to execute the command.

5. The testing/adjusting method according to claim 1, wherein the host device and the rotating-disk-type storage device are magnetic disk devices and wherein the testing/adjusting method comprises:
   the host device transferring the test/adjustment program of the first phase and the test/adjustment program of the second phase to the rotating-disk-type storage device; and
   the rotating-disk-type storage device, after receiving the test/adjustment program of the first phase and the test/adjustment program of the second phase from the host device, writing both of the programs onto a magnetic disk.

6. A method for testing/adjusting a first magnetic disk device and a second magnetic disk device, both connected to a host device via a data transmission path, the method comprising:
   the host device transferring the test/adjustment program of a first phase that is stored within the host device, to the first magnetic disk device and the second magnetic disk device;
   the first magnetic disk device and the second magnetic disk device executing the test/adjustment program of the first phase;
   the host device detecting that the first magnetic disk device or the second magnetic disk device is requesting a transfer of the test/adjustment program of a second phase that is stored within the host device; and
   in response to the request in the detecting, the host device transferring the test/adjustment program of the second phase to the first or second magnetic disk device requesting the transfer of the test/adjustment program of the second phase.

7. The testing/adjusting method according to claim 6, wherein the data transmission path includes a SCSI bus.

8. The testing/adjusting method according to claim 6, wherein the data transmission path includes an arbitrated loop of a fiber channel or a fabric switch of a fiber channel.

9. The testing/adjusting method according to claim 6, wherein the data transmission path includes an ATA bus.

10. The testing/adjusting method according to claim 9, wherein the data transmission path includes a test control apparatus for connecting the host device, the first magnetic disk device, and the second magnetic disk device, and establishing a communication path for either the first magnetic disk device or the second magnetic disk device with respect to the host device.

11. The testing/adjusting method according to claim 10, wherein the test control apparatus is set as either a master or slave at one end, and wherein the first magnetic disk device and the second magnetic disk device are set as masters or slaves at the other end.

12. The testing/adjusting method according to claim 6, wherein the host device operates in a host mode.

* * * * *

UNITED STATES PATENT AND TRADEMARK OFFICE
CERTIFICATE OF CORRECTION

PATENT NO. : 7,584,070 B2  Page 1 of 1
APPLICATION NO. : 11/177028
DATED : September 1, 2009
INVENTOR(S) : Kotani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Fourteenth Day of September, 2010

David J. Kappos
*Director of the United States Patent and Trademark Office*